US012269181B2

(12) United States Patent
Kuss et al.

(10) Patent No.: US 12,269,181 B2
(45) Date of Patent: Apr. 8, 2025

(54) METHOD FOR ASCERTAINING OBJECT INFORMATION WITH THE AID OF IMAGE DATA

(71) Applicant: Robert Bosch GmbH, Stuttgart (DE)

(72) Inventors: Alexander Kuss, Schoenaich (DE); Anh Vien Ngo, Nehren (DE); Miroslav Gabriel, Munich (DE); Philipp Christian Schillinger, Renningen (DE); Zohar Feldman, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 254 days.

(21) Appl. No.: 18/161,705

(22) Filed: Jan. 30, 2023

(65) Prior Publication Data

US 2023/0241781 A1 Aug. 3, 2023

(30) Foreign Application Priority Data

Feb. 2, 2022 (DE) .............. 10 2022 201 115.5

(51) Int. Cl.
*B25J 9/16* (2006.01)
*G06N 3/092* (2023.01)
(52) U.S. Cl.
CPC ............ *B25J 9/1697* (2013.01); *G06N 3/092* (2023.01)
(58) Field of Classification Search
CPC .......... B25J 9/1697; B25J 9/161; B25J 9/163; G06V 2201/06; G06V 10/22; G06V 10/82; G05B 2219/39484; G06T 1/0014; G06T 7/70; G06T 2207/10141; G06T 2207/20081; G06T 2207/20084; G06T 2207/30108

See application file for complete search history.

(56) References Cited

U.S. PATENT DOCUMENTS

| | | | |
|---|---|---|---|
| 9,679,258 B2* | 6/2017 | Mnih | A63F 13/67 |
| 2019/0236458 A1* | 8/2019 | Taylor | G06F 17/17 |
| 2020/0310442 A1* | 10/2020 | Halder | G05D 1/0221 |
| 2021/0173395 A1* | 6/2021 | Das | G06V 10/776 |

OTHER PUBLICATIONS

Lobbezoo, et al..: "Reinforcement Learning for Pick and Place Operations in Robotics: A Survey," Robotics 10, (2021), 2021, pp. 1-27; https://www.mdpi.com/2218-6581.

(Continued)

*Primary Examiner* — Khoi H Tran
*Assistant Examiner* — Nhi Q Bui
(74) *Attorney, Agent, or Firm* — NORTON ROSE FULBRIGHT US LLP; Gerard A. Messina

(57) ABSTRACT

A method for ascertaining object information from image data. The method includes training an agent with the aid of reinforcement learning, successively recording images according to actions that are output by the agent, after each recording, the agent obtaining information, generated from the previously recorded images, concerning the location of surface points of an object as state information, and ascertaining the object information from the recorded images with the aid of the machine learning model.

9 Claims, 3 Drawing Sheets

(56) References Cited

OTHER PUBLICATIONS

Mezei, et al.: "Sorting Objects from a Conveyer Belt Using POMDPs with Multiple-Object Observations and Information-Gain Rewards," Sensors 20, (2020), pp. 1-19. https://www.mdpi.com/1424-8220/20/9/2481/htm.

Sock, et al.: "Active 60 Multi-Object Pose Estimation in Cluttered Scenarios with Deep Reinforcement Learning," 2020 IEEE/RSJ International Conference on Intelligent Robots and Systems (IROS), 2020, p. 10564-10571, https://ieeexplore.ieee.org/stamp/stamp.jsp?tp=&arnumber=9340842&tag=1.

\* cited by examiner

METHOD FOR ASCERTAINING OBJECT INFORMATION WITH THE AID OF IMAGE DATA

FIELD

The present disclosure relates to a method for ascertaining object information with the aid of image data.

BACKGROUND INFORMATION

To allow flexible manufacturing or machining of objects by a robot, it is desirable for the robot to be able to handle an object, regardless of the position in which the object is placed in the robot's work space. Therefore, the robot should be capable of recognizing which portions of the object are situated at which positions, so that, for example, it may grip the object at the correct location in order to, for example, fasten it to another object, or to weld the object at the present location. This means that the robot should be able to recognize the pose (position and orientation) of the object or also areas of the object, such as a barcode made up of one or multiple images that are recorded by a camera that is fastened to the robot.

Approaches for this purpose are as follows: methods that derive a solution for a robot task from a single observation and carry out this solution in an open loop, methods that continuously detect new observations along the robot trajectory which update the predictions and follow the solution that appears most promising, either from a present or long-term perspective, methods that continuously detect new observations from a predefined set of perspectives (for example, along a spiral trajectory), and methods that continuously detect new observations from perspectives that are heuristically selected in order to improve the grip prediction (for example, by selecting perspectives that are directed toward locations having large variance in the prediction).

Although these approaches may provide good results in certain scenarios, the control may still be imprecise, or a large number of images may be necessary until the existing information about the object is sufficient for a reliable control. Therefore, approaches are necessary that have a high success rate and high data efficiency in controlling robotic devices, for example for picking up objects.

SUMMARY

According to various specific embodiments of the present invention, a method for ascertaining object information from image data is provided, including the training of an agent with the aid of reinforcement learning,
  a state being specified by information concerning the location, generated from one or multiple previously recorded images, of surface points of an object;
  each action from a set of possible actions being the recording of an additional image of the object from a particular perspective; and
  for each action from the set of possible actions, a reward for the action being a function of a change in the confidence in a piece of information concerning the object that is output by a machine learning model in response to the input of information concerning the location of surface points, generated from the one or multiple previously recorded images, of the object and the additional image, compared to the confidence in a piece of information concerning the object that the machine learning model outputs in response to the input of information concerning the location, which has been generated from the one or multiple previously recorded images, of surface points of the object, without the additional image.

According to an example embodiment of the present invention, the method further includes successively recording images according to actions that are output by the agent, after each recording, the agent obtaining information, generated from the previously recorded images, concerning the location of object surface points as state information, and ascertaining the object information from the recorded images with the aid of the machine learning model.

The above-described method allows the perspectives with which the new images are recorded to be selected in such a way that the benefit from the additional information is as great as possible, which increases the data efficiency.

By explicitly defining the value of the gained information as the improved confidence in the output of the machine learning model (for example, robot control information for a task) and using a mechanism, in the form of the training of the agent, which optimizes the information acquisition with regard to the defined value, a high success rate and better efficiency are achieved. The confidence in the output of the machine learning model may in particular reflect the accuracy of the output of the machine learning model.

By use of the method described above, greater efficiency may be achieved than with methods that record images from a predefined set of perspectives (which include the entire setting, for example), and greater accuracy may be achieved than with methods that attempt to improve the information acquisition with regard to heuristic metrics.

The above-described method may be applied to numerous robot control tasks, for example, which rely on sensor inputs in order to derive control information and the confidence in its success, and which allow the sensor input from various views to be fused in order to obtain a better understanding of the state. A primary example of such applications is gripping (in general, picking up) objects using a robot, the task being to pick up an object, and there being a machine pickup pose prediction model that derives from color images and depth images of the setting a pickup pose and a likelihood of success for the pickup. According to the above-described method, a decision is made as to where a robotic arm is to move: either into the predicted pickup pose, or in such a way that a camera fastened to the robotic arm may record the object from a perspective that results in an improved perception in order to improve the accuracy of the pickup pose prediction for the presently predicted pickup pose or for other, potentially better pickup poses.

For this purpose, according to an example embodiment of the present invention, the trained agent may be used to ascertain object information for an object that is new (i.e., not used in the training) by successively recording images corresponding to the actions that are output by the agent, and ascertaining object information therefrom (for example, until a predefined number of images is reached or an achieved confidence in the object information is reached). It is to be noted that it is not necessary for the object that is considered in the training to be the same object as for the application. In principle, the agent may generalize to arbitrary object types. In general, relevant settings may contain an arbitrary number of objects. If the application is, for example, gripping (in general, picking up) an object, training could be carried out, for example, using images that show a setting with many objects, since this is a typical application during gripping. On the other hand, for the training for a pose estimation, for example, it could be provided that a certain object occurs exactly once. In this way, the method may be trained for the desired application, but may also be applied to arbitrary objects and arbitrary settings in the frame.

It is to be noted in particular that "image of the object" may also contain multiple objects; i.e., it may also be an image of a setting that contains the object.

The above-described method is particularly relevant for detecting scenarios having a complex 3D geometry, for example complex object shapes or a disorder of objects. In such cases, an image that has been recorded from a single view may be very incomplete and may not deliver enough information to allow a good pickup of an object. The capability for incorporating an information acquisition model may be particularly useful here. This is the case in particular when a certain object must be selected from the disorder, or when objects must be gripped (or also suctioned) in a certain way.

According to one specific embodiment of the present invention, the machine learning model is trained to output, from information about the location of surface points of objects, information concerning the objects and the particular confidence (for example, via the form of the output itself (using "soft values," for example) or via an additional (confidence) output).

The information concerning an object may be control information for manipulating the object or also other information concerning the object, for example a surface structure, etc.

Various exemplary embodiments of the present invention are stated below.

Exemplary embodiment 1 is a method for ascertaining object information from image data as described above.

Exemplary embodiment 2 is a method according to exemplary embodiment 1, for each action from the set of possible actions, the reward being specified by a reward function that rewards when the confidence in the output increases and the output is correct, and when the confidence in the output decreases and the output is not correct, and that penalizes when the confidence in the output increases and the output is not correct, and when the confidence in the output decreases and the output is correct.

In this way, an increase in the confidence is rewarded only when the confidence is also justified, i.e., when it also reflects that a desired result is achieved. Likewise, a decrease in the confidence is rewarded when the confidence is unjustified.

Exemplary embodiment 3 is a method according to exemplary embodiment 1 or 2, the information concerning the object being pickup quality values for locations on the surface of the object that indicate how well the object may be picked up at the locations.

In particular in such a case, additional images provide greater reliability of the ascertainment of pickup poses (for gripping or suctioning, for example). By recording the images according to the actions that are output by the agent, a high level of reliability may be achieved even with a few images.

Exemplary embodiment 4 is a method according to exemplary embodiment 3, including selecting a location for picking up from the locations in which the confidence in the information concerning the object is the confidence in the pickup quality value for the selected location.

The agent may thus be trained, in a targeted manner for a certain pickup location (for example, the best-suited pickup location), to increase the confidence by acquiring additional image data that are suitable for this purpose.

Exemplary embodiment 5 is a method according to one of exemplary embodiments 1 through 4, including ascertaining the information concerning the location of surface points of the object, which is generated from the one or multiple previously recorded images and the additional image by integrating information, gained from the additional image, into the information concerning the location of surface points of the object that has been generated from the one or multiple previously recorded images, without the additional image.

The information concerning the location of surface points (i.e., the location information), i.e., the input for the machine learning model (a neural network, for example) that ascertains the information concerning the object, is thus successively improved by the newly gained information. An efficient improvement process of the input data is thus ensured, which may be discontinued when the quantity of information is sufficient (and correspondingly, the confidence in the output of the machine learning model is sufficiently high), or when a certain budget (the number of images, for example) is exhausted.

Exemplary embodiment 6 is the method according to one of exemplary embodiments 1 through 5, including estimating an object pose and/or a pickup pose (a gripping pose, for example) from the ascertained object information.

In particular for these applications, the above-described method allows an efficient ascertainment of the particular object information.

Exemplary embodiment 7 is a camera control system that includes one or multiple cameras, and a camera control device that is configured to carry out a method according to one of exemplary embodiments 1 through 6.

Exemplary embodiment 8 is a robotic control device that includes a camera control system according to exemplary embodiment 7 and that is configured to control the robotic device according to the object information ascertained from the recorded images.

Exemplary embodiment 9 is a computer program that includes instructions which, when executed by a processor, prompt the processor to carry out a method according to one of exemplary embodiments 1 through 6.

Exemplary embodiment 10 is a computer-readable medium that stores instructions which, when executed by a processor, prompt the processor to carry out a method according to one of exemplary embodiments 1 through 6.

In the figures, similar reference numerals generally refer to the same parts in all the various views. The figures are not necessarily true to scale, emphasis instead being placed in general on illustrating the principles of the present invention. In the following description, various aspects are described with reference to the figures.

DETAILED DESCRIPTION OF EXAMPLE EMBODIMENTS

The following detailed description relates to the figures, which for explanation show particular details and aspects of this disclosure in which the present invention may be carried out.

Other aspects may be used, and structural, logical, and electrical modifications may be made, without departing from the scope of protection of the present invention. The various aspects of this disclosure are not necessarily mutually exclusive, since some aspects of this disclosure may be combined with one or multiple other aspects of this disclosure to form new aspects.

Various examples are described in greater detail below.

Figure 1:
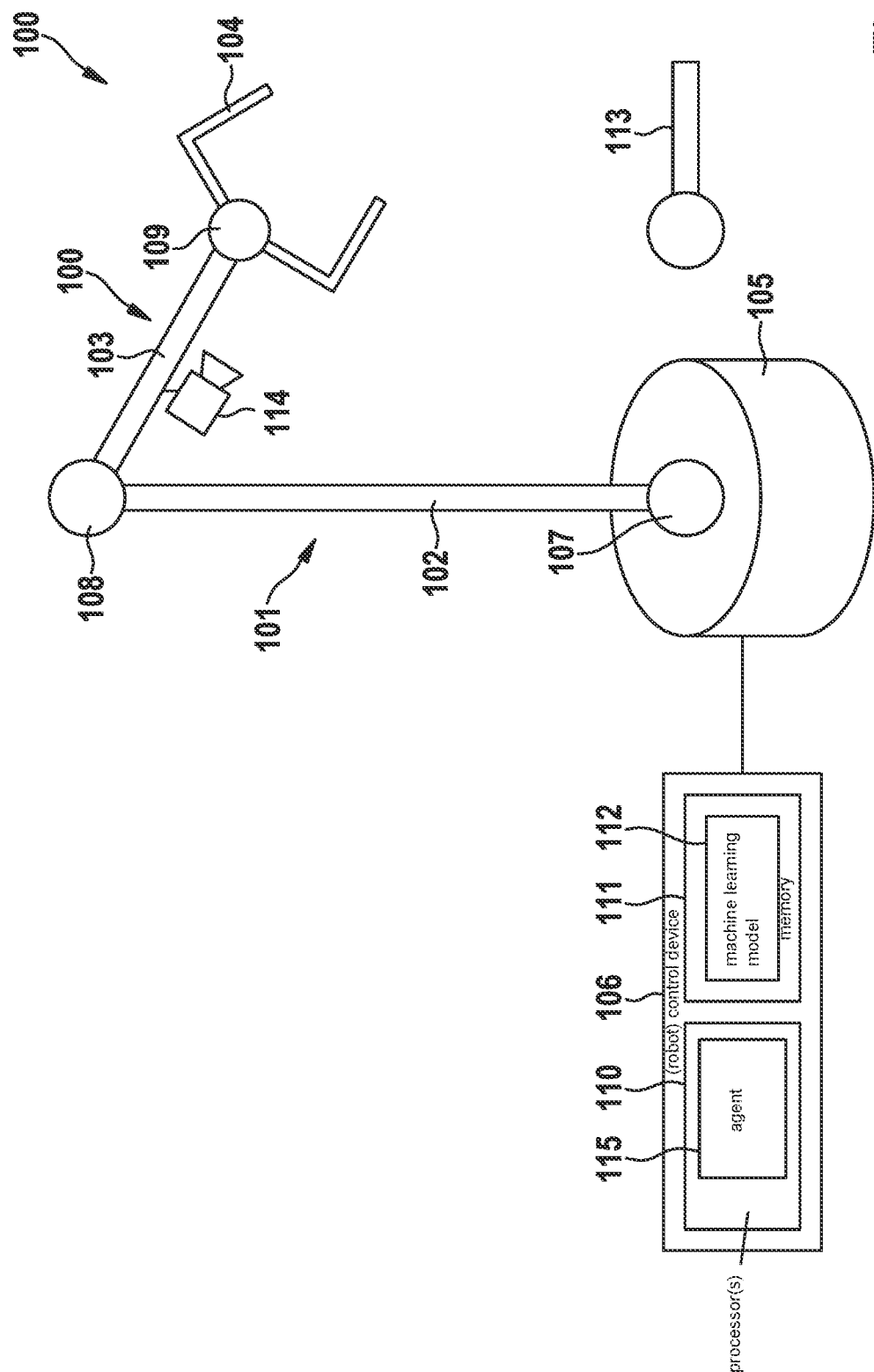
FIG. 1 shows a robot according to an example embodiment of the present invention.

FIG. 1 shows a robot 100.

Robot 100 includes a robotic arm 101, for example an industrial robotic arm for handling or mounting a workpiece (or one or multiple other objects). Robotic arm 101 includes manipulators 102, 103, 104 and a base (or support) 105 with the aid of which manipulators 102, 103, 104 are supported. The term "manipulator" refers to the components of robotic arm 101, whose actuation allows a physical interaction with the surroundings, for example to perform a task. For control, the robot 100 contains a (robotic) control device 106 that is configured in such a way that it implements the interaction with the surroundings according to a control program. Last component 104 (farthest from base 105) of manipulators 102, 103, 104 is also referred to as an end effector 104, and may contain one or multiple tools such as a welding torch, a gripping instrument, a painting device, or the like.

The other manipulators 102, 103 (closer to base 105) may form a positioning device, so that together with end effector 104, robotic arm 101 with end effector 104 at its end is provided. Robotic arm 101 is a mechanical arm that may provide functions similarly to a human arm (possibly including a tool at its end).

Robotic arm 101 may include joint elements 107, 108, 109 that connect manipulators 102, 103, 104 to one another and to base 105. A joint element 107, 108, 109 may include one or multiple joints, each of which may provide a rotary movement (i.e. a rotation) and/or a translational movement (i.e., a displacement) of associated manipulators relative to one another. The movement of manipulators 102, 103, 104 may be initiated with the aid of actuators that are controlled by control device 106.

The term "actuator" may be understood as a component that is designed to effectuate a mechanism or process as a response to being driven. The actuator may implement instructions that are created by control device 106 (so-called activation) and convert them into mechanical movements. The actuator, for example an electromechanical converter, may be designed to convert electrical energy into mechanical energy as a response to being driven.

The term "control device" may be understood as any type of logic-implementing entity that may include, for example, a circuit and/or a processor that is capable of executing software that is stored in a memory medium, firmware, or a combination thereof, and that may issue instructions, for example to an actuator in the present example. The control device may be configured by program code, for example (software, for example) to control the operation of a system, a robot in the present example.

In the present example, control device 106 includes one or multiple processors 110, and a memory 111 that stores code and data on the basis of which processor 110 controls robotic arm 101. According to various specific embodiments, control device 106 controls robotic arm 101 based on a machine learning model 112 that is stored in memory 111.

According to various specific embodiments, machine learning model 112 is designed and trained to allow robot 100 to recognize from camera images a pickup pose of an object 113 that is placed, for example, in a work space of robotic arm 101, for example for a robot that is to pick up objects from a box (bin picking).

Robot 100 may be equipped with one or multiple cameras 114, for example, which allow the robot to record images of its work space. One camera 114 is fastened to robotic arm 101, for example, so that the robot may pick out images of object 113 from various perspectives by moving robotic arm 101 around. Control device 106, with the aid of machine learning model 112, may then ascertain from the image data (in general, sensor data) delivered from camera 114 information concerning object 113 (or the objects), on the basis of which control device 106 then controls robotic arm 101. Pickup quality values of surface points of object 113 are one example of such information, i.e., for locations of the surface of the object, in each case a value that indicates how well the object may be picked up (gripped or suctioned) at the location.

Various approaches exist for training machine learning models, in particular deep neural networks, which include image data (typically RGB images and depth images) as input and which output information for carrying out a robot task. For example, a full convolution network may be used to predict a value (a pickup quality, for example) for each pixel in an input camera image (for example, with RGB channels and a depth channel). In the case of gripping by robots, this value corresponds, for example, to the likelihood that a successful grip takes place at the location in space that corresponds to the pixel.

In the following discussion, it is assumed that for a task for a robotic device (such as picking up an object 113 by robotic arm 101), a machine learning model 112 is present which, based on incomplete (input) information (for example, concerning the location of surface points of object 113) gained from sensor observations (images, for example) of the surroundings, delivers (control) information for carrying out the task (such as pickup quality values for locations of the surface of object 113).

Typically, the control information for carrying out the task is more reliable (i.e., its confidence is greater) the more accurate or complete the input information is that is gained from the sensor observations (camera images, for example). For reasons of data efficiency, it is of interest to collect those sensor data that result in the greatest possible confidence in the control information. This confidence may additionally be output by machine learning model 112.

Thus, according to various specific embodiments, a method is provided that allows a deduction as to how a sensor (a camera 114, for example) is to be moved in order to gain new input information that would improve the perception of the surroundings and consequently result in a better achievement of the task, the latter being quantified by use of the confidence in an output of machine learning model 112.

For this purpose, according to various specific embodiments an agent 115 is provided that is implemented by processor 110, for example. For the processor, a control strategy, in this case an information acquisition strategy, is learned, which for a certain robot task, and with regard to the present (input) information state, decides where camera 114 is to be moved, for example, so that the input information gained from this movement and all subsequent movements (and measurements carried out) may be focused on efficiently maximizing the confidence in the control information derived therefrom.

Figure 2:
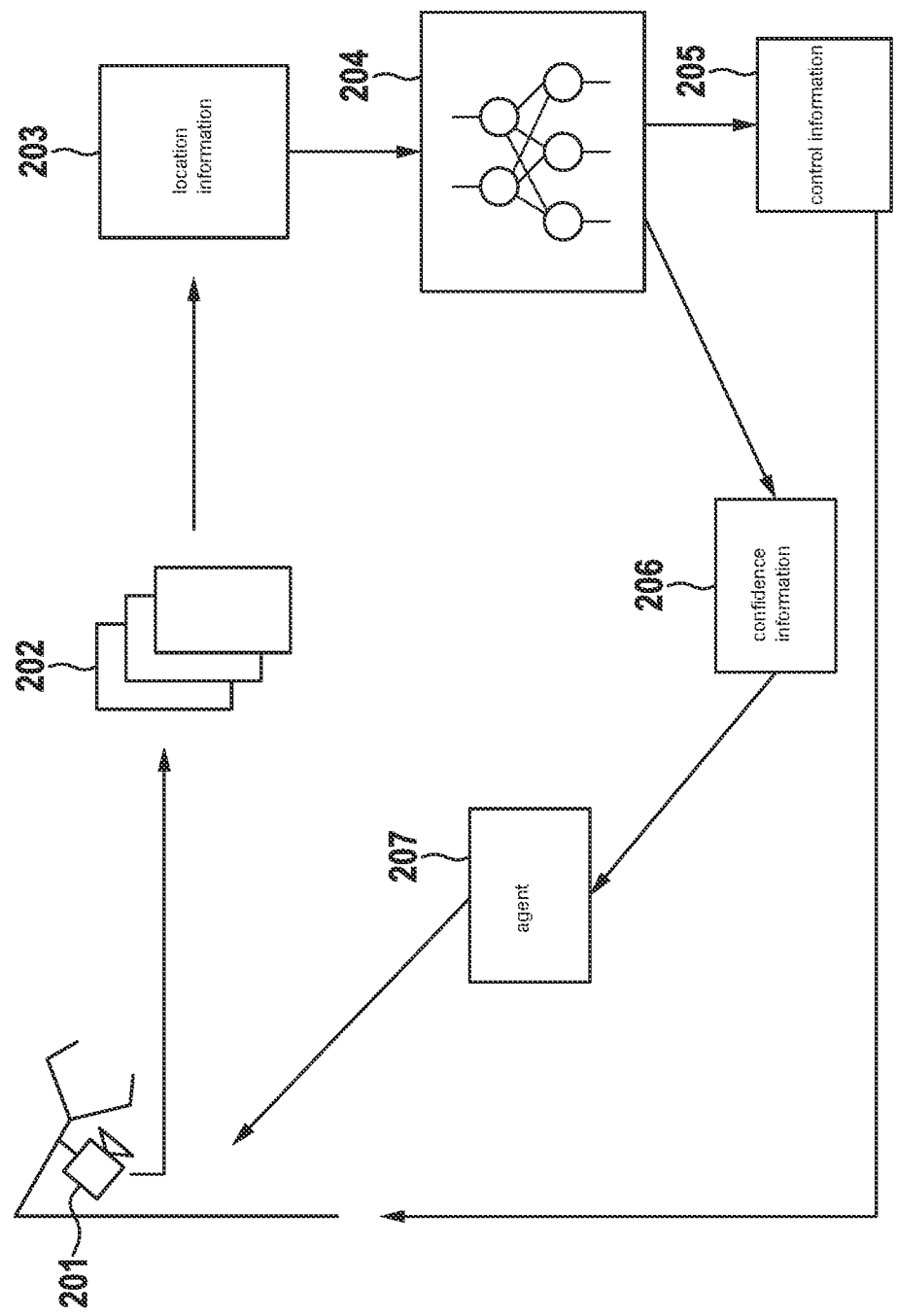
FIG. 2 illustrates a sequence for acquiring sensor information for controlling a robot according to one specific embodiment of the present invention.

FIG. 2 illustrates a sequence for acquiring sensor information for controlling a robot according to one specific embodiment.

A camera 201 (corresponding to camera 114, for example) supplies a camera image 202 in each case to one or multiple positions at which the camera is situated (for example, moved by robotic arm 101). (Position) information 203 concerning the location of surface points of an object 113 to be manipulated (picked up, for example) is gained from these camera images. This may take place, for example, by transformation into a point cloud.

Multiple images 202 may be fused to form a single (visual) representation, for example, that contains location information 203 that is more accurate and complete than each of the single images. This may be achieved by transforming images 202 (RGB images and depth images, for example) into point clouds and representing them in the form of values of a truncated signed distance function (TSDF) that represents the surroundings of object 113 via a grid of voxels (three-dimensional pixels), each voxel having a value that indicates the distance from the closest point on the surface of object 113. The TSDF may be updated via point clouds (using additional new images that are recorded in various views). A fused point cloud as well as a depth image may be extracted from the TSDF (from an arbitrary perspective) with the aid of ray casting.

Location information 203 (for example, in the form of the values of the voxels of the TSDF) is supplied to a machine learning model 204 (machine learning model 112, for example), for example a neural network that ascertains control information 205 therefrom (for example, pickup quality values as described above).

For this control information 205, machine learning model 112 supplies confidence information, i.e., information that indicates how certain machine learning model 112 is of control information 205. This may be, for example, information that is output by a Bayesian neural network and that indicates how certain the neural network is. However, the confidence information may also merely be soft values that are output by the machine learning model. For example, a value equal to 1 indicates a location at which the object may be gripped with certainty at the location, and a value equal to 0.8 indicates that the object may be gripped at the location, but machine learning model 112 has only 80% certainty.

Based on confidence information 206, an agent 207 (corresponding to agent 115, for example) decides whether, and if so, from which perspective, a further camera image is to be recorded, and optionally appropriately controls camera 201.

Camera 201 may be mounted on a servo system that is controlled independently of the robot or (as illustrated in FIGS. 1 and 2) that is mounted on the robotic arm (for example, at the "wrist joint" or at the end effector), the movement of the camera taking place via the movement of the robot.

According to various specific embodiments, agent 207 is trained with the aid of reinforcement learning. The control of camera 201 for recording an image from a certain perspective (for example, in particular the movement of camera 201 into a certain position) is an action of agent 207.

For this training, the information acquisition task to be carried out by agent 207 (i.e., the task for controlling camera 201 for recording images 202) is modelled as a Markov decision process (MDP).

The MDP is defined by a state space, an action space (i.e., a set of possible actions), a reward function that assigns a reward for the application of a certain action in a certain state, and a transition likelihood function that indicates the likelihood of transitioning, for a certain state during the application of a certain action, into a certain other state.

In the present case, each state of the state space corresponds to a particular information state (for example, to the TSDF, i.e., location information 203). The actions of the action space correspond to the camera movements (and associated image recordings), and the reward function rewards an increase in the confidence in control information 205 that results from the camera movement (and associated recorded images 202). The reward function is selected (trained, for example) in such a way that it represents a correlation between the confidence and the actual success. This means that when the confidence in a piece of control information has become greater and a control of the robot according to this control action is also successful, this is rewarded. The state transition for an action (camera movement) results from integrating the information from the image, which was recorded using the new camera position, into location information 203.

The MDP allows the long-term value of the actions (in the sense of a gain in the information or confidence) to be taken into account. The objective of training of agent 207, which selects the actions for the MDP (i.e., makes the decision), is to find an optimal strategy for the agent, i.e., to assign to each state an action that maximizes the sum of accumulated rewards. In the present case, this strategy that agent 207 follows may be regarded as an information acquisition strategy.

An optimal strategy for an MDP may be computed via dynamic programming, using the Bellman equation. As mentioned above, according to various specific embodiments, reinforcement learning is used for ascertaining the (information acquisition) strategy. Reinforcement learning is a learning paradigm that ascertains strategies for MDPs by interacting with the particular system (which is specified by the state space and the transition likelihoods), collecting samples as tuples (state, action, reward, next state), and applying the Bellman equation in order to compute the values of states and actions (in the sense of utilizing, i.e., values for RL).

According to various specific embodiments, for training agent 207 according to the MDP described above a neural value network, for example a full convolution network, is trained. The value network obtains a given (information) state from the state space of the MDP, and outputs the long-term value of the movement of the camera into a certain pose, for example for a certain target gripping position (i.e., corresponding to the increase in confidence for this gripping pose, for example the gripping pose that would be used according to control information 205, as ascertained by machine learning model 112 from the previous images or also for other gripping poses that seem promising based on the present information). In the case that the application is a pose estimation, a present pose estimation, for example, replaces the target gripping position.

The derivation of a certain camera position to which the camera is to be moved (by agent 207) may take place either by evaluating a series of possible movements and selecting one of them (for example, the movement having the highest value as output to it by the value network) or by training some other machine learning model (for example, a further neural network, in particular a full convolution network) that obtains the present information state as input and outputs a camera position that maximizes the value derived by the value network. This latter approach corresponds to an actor-critic scenario.

For training the value network (or the value model in general), the control device (or also some other device that takes over the training) may collect RL examples by direct experimentation with the particular system or the particular surroundings. For example, for various scenarios (object positions, for example), various camera trajectories are generated, and the information states that occur and the camera positions at the various points along the trajectories are stored. For this purpose, control information 205 is ascertained in each case, a control corresponding thereto is carried out (for example, robotic arm 101 for recording object 113 is controlled), and the control information as well as the information concerning whether the control action was successful (for example, whether it was possible to record the object) are stored. RL samples may be generated based on these data. The rewards are computed retroactively, a positive reward being assigned when the change in the confidence in a gripping position matches the success of the gripping position (i.e., when the confidence that the gripping position is good has increased, and the control (i.e., the gripping at the gripping position) was successful, and when the confidence that the gripping position is good has decreased, and the control has failed). Correspondingly, the reward is negative when the confidence that the gripping position is good has decreased, and the control was successful, and when the confidence that the gripping position is good has increased, and the control has failed.

If agent 207 (in particular the value network) has been trained, control device 106 may operate as follows for carrying out a task (for example, picking up object 113): The control device, with the aid of camera 201, records an image of the starting position. This supplies a first information state (i.e., a first version of location information 203). For a fixed budget of camera movements (and camera images 202), or as long as the confidence in a gripping position (provided by control information 205, for example the maximum of the pickup quality values across the surface of the object) is not satisfactory (or as long as a different abort criterion is not met), agent 207 selects (from the particular output of the value model) a camera movement for the present information state. Control device 106 correspondingly controls camera 201 so that it carries out the movement, and in the reached position records an additional camera image 202, and the information state is updated corresponding to the additional information gained therefrom.

Figure 3:
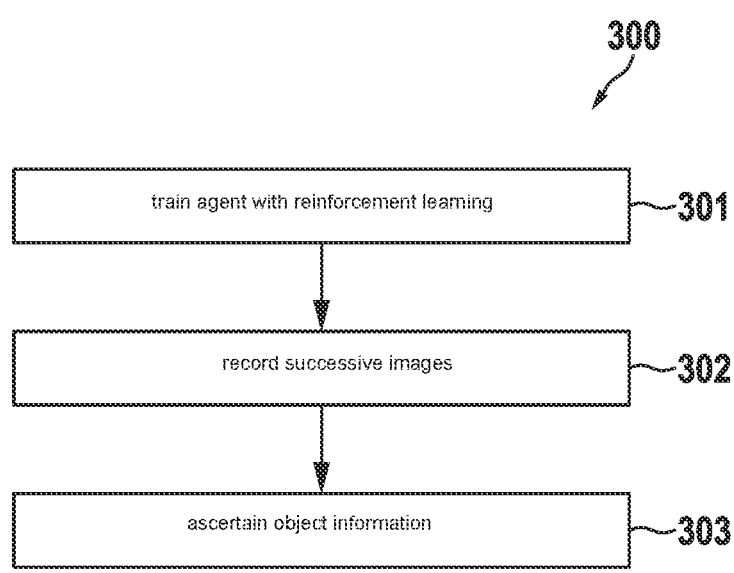
FIG. 3 shows a flowchart illustrating a method for ascertaining object information with the aid of image data according to one specific embodiment of the present invention.

In summary, according to various specific embodiments a method is provided as illustrated in FIG. 3.

FIG. 3 shows a flowchart 300 illustrating a method for ascertaining object information with the aid of image data according to one specific embodiment.

An agent is trained in 301 with the aid of reinforcement learning. States, actions, and rewards are specified as follows:
a state is specified by information concerning the location of surface points of an object (i.e., object surface points, for example for one of multiple training objects) that is generated from one or multiple previously recorded images;
each action is the recording of an additional image of the object from a particular perspective;
for each action from the set of possible actions, a reward for the action is a function of a change in the confidence in a piece of information concerning the object (for example, corresponding to (i.e., of the type of) the object information to be ascertained) that a machine learning model outputs in response to the input of information concerning the location of surface points of the object that is generated from the one or multiple previously recorded images and the additional image, compared to the confidence in a piece of information concerning the object that the machine learning model outputs in response to the input of information concerning the location of surface points of the object that has been generated from the one or multiple previously recorded images, without the additional image.

Successive images are recorded in 302 according to actions that are output by the (trained) agent, after each recording of an image the agent (similarly as for the training) obtaining information, generated from the previously recorded images, concerning the location of object surface points (for example, of an object to which the trained agent is applied) as state information.

The object information from the recorded images is ascertained in 303 with the aid of the machine learning model (the same as in the training).

An arbitrary RL method may be used for the training.

The method from FIG. 3 may be carried out by one or multiple computers that include one or multiple data processing units. The term "data processing unit" may be understood as any type of entity that enables the processing of data or signals. The data or signals may be treated, for example, according to at least one (i.e., one or more than one) particular function that is carried out by the data processing unit. A data processing unit may include an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination of same or may be formed from same. Any other way of implementing the particular functions, described in greater detail herein, may also be understood as a data processing unit or logic circuit system. One or multiple of the method steps described in detail here may be carried out (implemented, for example) by a data processing unit via one or multiple particular functions that are carried out by the data processing unit.

The approach from FIG. 3 may be used to generate a control signal for a robotic device. The term "robotic device" may be understood to mean any technical system (including a mechanical part whose movement is controlled), such as a computer-controlled machine, a vehicle, a household appliance, a power tool, a production machine, a personal assistant, or an access control system. The object information may be used as the basis for controlling the technical system.

The image data may be data from various types of (camera) images, such as video images, radar images, LIDAR images, ultrasound images, movement images, thermal images, etc.

The method is computer-implemented, for example.

Although particular specific embodiments have been illustrated and described here, it is recognized by those skilled in the art in the field that the particular specific embodiments shown and described may be exchanged with numerous alternative and/or equivalent implementations without departing from the scope of protection of the present invention. The present patent application is intended to encompass any adaptations or variations of the particular specific embodiments discussed here.

What is claimed is:

1. A method for ascertaining object information using image data, comprising the following steps:
training an agent using reinforcement learning, wherein:

a state is specified by information concerning a location, generated from one or multiple previously recorded images, of surface points of an object;

each action from a set of possible actions includes recording an additional image of the object from a particular perspective, and for each action from the set of possible actions, a reward for the action is a function of a change in a confidence in a piece of information concerning the object that is output by a machine learning model in response to an input of information concerning the location of surface points, generated from the one or multiple previously recorded images, of the object and the additional image, compared to a confidence in a piece of information concerning the object that the machine learning model outputs in response to the input of information concerning the location, which has been generated from the one or multiple previously recorded images, of surface points of the object, without the additional image;

successively recording images according to actions that are output by the agent, and, after each recording, the agent obtains information, generated from the previously recorded images, concerning the location of object surface points as state information; and ascertaining the object information from the recorded images using the machine learning model.

2. The method as recited in claim 1, wherein for each action from the set of possible actions, the reward is specified by a reward function that rewards: (i) when confidence in the output increases and the output is correct, and (ii) when the confidence in the output decreases and the output is not correct, and that penalizes: (i) when the confidence in the output increases and the output is not correct, and (ii) when the confidence in the output decreases and the output is correct.

3. The method as recited in claim 1, wherein the information concerning the object includes pickup quality values for locations on the surface of the object that indicate how well the object may be picked up at the locations.

4. The method as recited in claim 3, further comprising selecting a location for picking up from the locations in which the confidence in the information concerning the object is a confidence in the pickup quality value for the selected location.

5. The method as recited in claim 1, further comprising ascertaining the information concerning the location of surface points of the object, which is generated from the one or multiple previously recorded images and the additional image, by integrating information, gained from the additional image, into the information concerning the location of surface points of the object that has been generated from the one or multiple previously recorded images, without the additional image.

6. The method as recited in claim 1, further comprising estimating an object pose and/or a pickup pose from the ascertained object information.

7. A camera control system, comprising:
one or multiple cameras; and
a camera control device configured to ascertain object information using image data, the camera control device configured to:
  train an agent using reinforcement learning, wherein:
    a state is specified by information concerning a location, generated from one or multiple previously recorded images, of surface points of an object;
    each action from a set of possible actions includes recording an additional image of the object from a particular perspective, and
    for each action from the set of possible actions, a reward for the action is a function of a change in a confidence in a piece of information concerning the object that is output by a machine learning model in response to an input of information concerning the location of surface points, generated from the one or multiple previously recorded images, of the object and the additional image, compared to a confidence in a piece of information concerning the object that the machine learning model outputs in response to the input of information concerning the location, which has been generated from the one or multiple previously recorded images, of surface points of the object, without the additional image;
  successively record images according to actions that are output by the agent, and, after each recording, the agent obtains information, generated from the previously recorded images, concerning the location of object surface points as state information; and
  ascertain the object information from the recorded images using the machine learning model.

8. A robotic control device, comprising:
a camera control system including:
  one or multiple cameras; and
  a camera control device configured to ascertain object information using image data, the camera control device configured to:
    train an agent using reinforcement learning, wherein:
      a state is specified by information concerning a location, generated from one or multiple previously recorded images, of surface points of an object;
      each action from a set of possible actions includes recording an additional image of the object from a particular perspective, and
      for each action from the set of possible actions, a reward for the action is a function of a change in a confidence in a piece of information concerning the object that is output by a machine learning model in response to an input of information concerning the location of surface points, generated from the one or multiple previously recorded images, of the object and the additional image, compared to a confidence in a piece of information concerning the object that the machine learning model outputs in response to the input of information concerning the location, which has been generated from the one or multiple previously recorded images, of surface points of the object, without the additional image;
    successively record images according to actions that are output by the agent, and, after each recording, the agent obtains information, generated from the previously recorded images, concerning the location of object surface points as state information; and
    ascertain the object information from the recorded images using the machine learning model,
wherein the robotic control device is configured to control the robotic device according to the object information ascertained from the recorded images.

9. A non-transitory computer-readable medium on which are stored instructions for ascertaining object information using image data, the instructions, when executed by a processor, causing the processor to perform the following steps:
- training an agent using reinforcement learning, wherein:
  - a state is specified by information concerning a location, generated from one or multiple previously recorded images, of surface points of an object;
  - each action from a set of possible actions includes recording an additional image of the object from a particular perspective, and
  - for each action from the set of possible actions, a reward for the action is a function of a change in a confidence in a piece of information concerning the object that is output by a machine learning model in response to an input of information concerning the location of surface points, generated from the one or multiple previously recorded images, of the object and the additional image, compared to a confidence in a piece of information concerning the object that the machine learning model outputs in response to the input of information concerning the location, which has been generated from the one or multiple previously recorded images, of surface points of the object, without the additional image;
- successively recording images according to actions that are output by the agent, and, after each recording, the agent obtains information, generated from the previously recorded images, concerning the location of object surface points as state information; and
- ascertaining the object information from the recorded images using the machine learning model.

* * * * *